Nov. 20, 1934.　　　F. H. GULLIKSEN　　　1,981,040
REGULATING SYSTEM
Filed Nov. 12, 1932　　2 Sheets-Sheet 1

WITNESSES:
E. A. M?Closkey.
C. F. Bryant

INVENTOR
Finn H. Gulliksen.
BY
Franklin E. Hardy
ATTORNEY

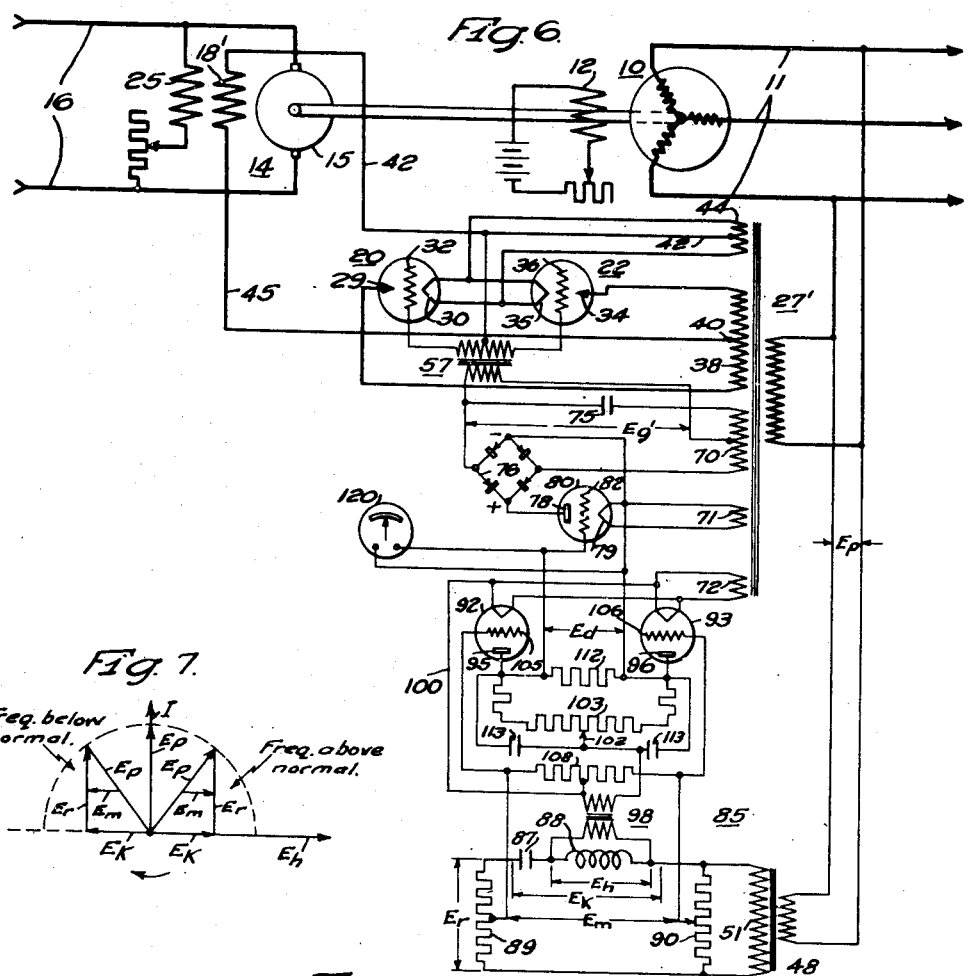

Patented Nov. 20, 1934

1,981,040

UNITED STATES PATENT OFFICE 1,981,040

REGULATING SYSTEM

Finn H. Gulliksen, Wilkinsburg, Pa., assignor to Westinghouse Electric & Manufacturing Company, East Pittsburgh, Pa., a corporation of Pennsylvania Application November 12, 1932, Serial No. 642,418

6 Claims. (Cl. 171—119)

My invention relates to regulating systems, and it has particular relation to systems for maintaining constant the frequency of the voltage of an alternating-current generator or circuit.

An object of my invention is to provide a frequency regulating system which is simple in construction, relatively inexpensive, and reliable in operation.

Another object of my invention is to provide a frequency regulating system which possesses high sensitivity and close regulatory precision.

A further object of my invention is to provide a regulating system which is particularly applicable to generators and circuits with which frequency-adjusting means of the electronic-tube type are utilized.

An additional object of my invention is to provide a system of the type described, which is particularly applicable to the control of motor-driven generators.

A still further object of my invention is to provide a regulating system of the type described, in which no mechanically movable contact members are required.

In practicing my invention, I provide, when applying it to a motor-driven generator, for example, the generator driving motor with speed-adjusting means comprising electronic tubes so disposed that variations in their effective conductivity effect corresponding changes in the speed of the driven generator. The conductivity of these tubes is controlled by means of a frequency-responsive bridge circuit, which is acted upon by the generator voltage in such manner that a change from the desired value of frequency is caused to effect an appropriate corrective change in the generator speed which restores the frequency to the desired value.

My invention will best be understood from the following description of specific embodiments thereof, when taken in conjunction with the accompanying drawings, in which:

Fig. 6 is a diagrammatic view of apparatus and circuits arranged in accordance with a second embodiment of my invention, in which the motor driven generator of Fig. 1 is regulated through the medium of apparatus, comprising a vacuum tube the grid bias of which is controlled through a second variety of frequency-responsive bridge circuit influenced by the generator voltage;

Fig. 7 is a diagram of vectors illustrating the action of the frequency-responsive bridge circuit utilized by the system of Fig. 5; and Fig. 8 is a partial showing of the complete system of Fig. 5 illustrating the combination therewith of a third variety of frequency-responsive bridge circuit.

Figure 1:
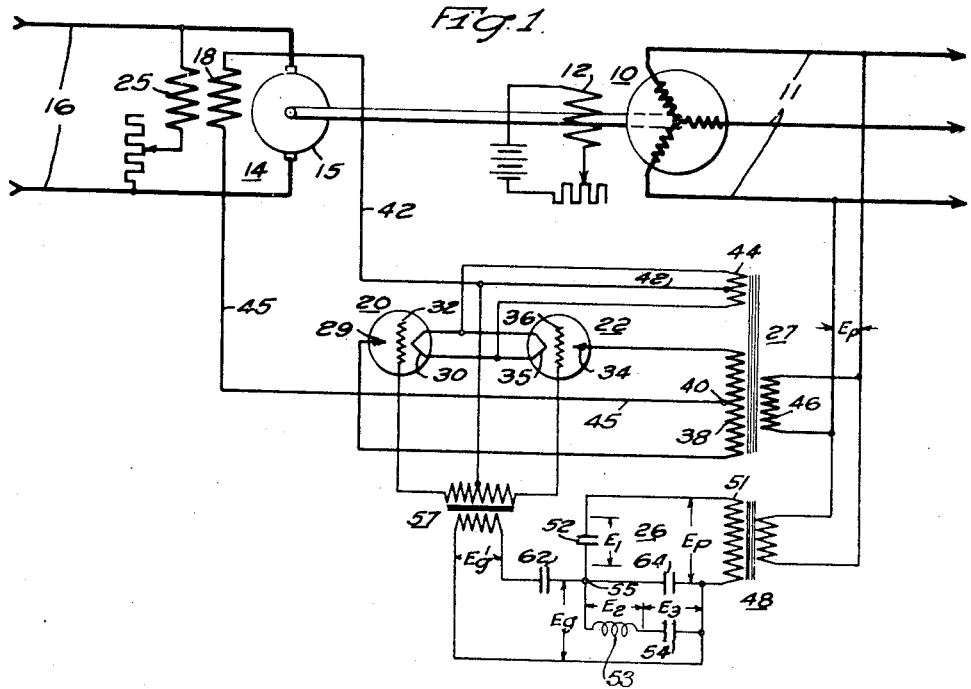
Figure 1 is a diagrammatic view of apparatus and circuits illustrating one embodiment of my invention applied to regulate the frequency of an alternating-current generator which is driven by a motor, the speed of which is controlled through the medium of electronic tubes of the grid-controlled gas-filled type.

Referring to the drawings and particularly to Fig. 1, thereof, the generator, whose frequency is to be regulated, is shown generally at 10 as comprising armature windings connected with circuit conductors 11 and a field winding 12. The generator is driven by a direct-current motor 14, which is shown as comprising an armature winding 15, which may be energized from any suitable source of direct-current potential represented by circuit conductors 16, and a regulating field winding 18, which is shown as being energized by direct-current through rectifying means comprising electronic tubes 20 and 22, which tubes are supplied from the alternating-current generator circuit conductors 11 through a transformer 27.

In addition to the regulating field winding 18, motor 14 is supplied with a second field winding 25, which is continuously energized, and which will be seen to provide the driving motor with excitation independently of that derived from winding 18. In the system of Fig. 1, it is preferable, as will be explained, that windings 18 and 25 be differentially related.

The conductivity of electronic tubes 20 and 22, through which motor field winding 18 is energized, is, in the system of Fig. 1, directly controlled by means of a frequency-responsive bridge circuit 26 interposed between the tubes and the regulated generator. Tubes 20 and 22 are preferably of the well-known grid-controlled gas-filled type. As shown, tube 20, for example, comprises two major elements, an anode or plate 29 and an electrically heated cathode 30, and one minor or control grid element 32. Tube 22 will be seen to similarly comprise anode, cathode and grid elements 34, 35 and 36, respectively.

When disposed in the manner shown, tubes 20 and 22 effect full-wave rectification of the alternating current that energizes the motor field winding 18, it being observed that the tubes are disposed in the circuits that include as an energizing source the portions of the secondary winding 38 of transformer 27 on opposite sides, respectively, of a mid-tap connection 40.

The tubes possess the well-known characteristic of passing current between the major elements in one direction only,—from anode to cathode, so that when energized from an alternating-current source current passage can take place only during the positive half cycle of tube anode voltage. Thus when connected, as in the system of Fig. 1, tube 20 passes current through field motor winding 18 during the half of the alternating-current cycle in which the lower end of transformer winding 38 is positive with respect to the upper portions thereof, while tube 22 similarly passes current during the other half cycle, in which the upper end of winding 38 is at a positive potential with respect to the lower portions thereof. It will be observed that this winding energizing circuit is completed by a conductor 42, joined with the mid-tap connection of a cathode heating winding 44, and a second conductor 45 that connects motor-field winding 18 with the mid-tap 40 of transformer winding 38. Winding 44 may, as shown, form a part of transformer 27, the primary winding 46 of which is directly energized from circuit conductors 11, or, if desired, it may be incorporated in a separate transformer.

In a tube of the type under consideration, the portion of the positive half cycle of anode voltage during which conduction takes place, and hence the effective current passed, may be regulated by suitably modifying the control potential impressed upon the grid element. In order that the tube conduct current through its major element circuit, it is necessary that the control grid element thereof be maintained at a potential in excess of some given critical value. A series of minimum or critical values of grid voltage is represented in Fig. 5 by curve $E_x$, which curve is related to the wave of anode voltage $E_p$ impressed upon the major-element circuit of the tube in the manner shown.

Curve $E_x$ will be recognized as applying to a hot cathode tube of the mercury-filled type, which tube behaves in the manner that if a negative bias be maintained on the grid in excess of a given series of values throughout the cycle no current conduction between the major elements can take place. However, if this negative current bias voltage falls below the critical value $E_x$, current conduction from that point during the remainder of the positive half cycle will take place.

Figure 5:
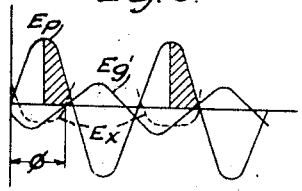
Fig. 5 is a diagram showing the manner in which the electronic tubes utilized by the system of Fig. 1 function to rectify and control the magnitude of the energizing current supplied, from an alternating-current source of power, to a field winding of the generator driving motor.

Consequently, when the position of a wave of grid voltage is that represented by $E_{g'}$ in Fig. 5, current conduction will result during the shaded portion of the positive half cycle. As will be apparent, the starting point of such conduction may be changed by shifting the point of intersection of the control potential curve $E_{g'}$ with the critical voltage curve $E_x$.

To effect control of the position of the grid voltage wave $E_{g'}$ with respect to the anode voltage wave $E_p$, the before-mentioned frequency-responsive bridge circuit 26 is disposed intermediate the source of grid voltage and the control elements of the tubes. Bridge circuit 26 is shown as being energized from generator conductors 11 through a transformer 48, having a secondary winding 51, which serves to energize the capacitor 52 in series with an inductance 53 and a second capacitor 54. The common point 55 of the two elements first named is joined with one end of the primary winding of a grid-coupling transformer 57, the other end of which primary winding is joined with the lower end of transformer winding 51.

The inductance 53 and capacitor 54 are preferably so proportioned electrically that when the frequency of the generator voltage is of the desired value these two elements will present reactances to the flow of alternating current therethrough which are approximately equal and hence which approach the resonance or neutralizing condition. For such a condition, the vector relations shown in Fig. 2 apply. As is there illustrated, when the frequency of the voltage $E_p$ is such that reactance drop $E_2$ across inductor 53 is equal to the reactance drop $E_3$ across capacitor 54, these two quantities are in direct phase opposition, and neutralize one another, the effective resistance only of elements 53 and 54 accounting for the total voltage drop $E_g$ appearing across the two.

Figure 2:
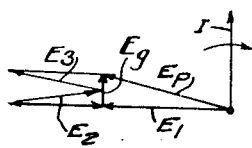
Figs. 2, 3 and 4 are diagrams of vectors illustrating the action of the frequency-responsive phase-shifting bridge circuit utilized in the system shown in Fig. 1.

Also in the circuit which is energized by winding 51 is capacitor 52, which capacitor accounts for the total reactance presented to the flow of current for the resonance condition named. When such is the case, the current I will lead the voltage $E_p$ by substantially 90°, as is represented in Fig. 2. Voltage $E_g$ being in the nature of a resistance drop will be in phase with the current and will thus occupy the position shown in Fig. 2. For the condition of resonance the magnitude of voltage $E_g$ will be very low.

As is well known, the reactance presented by an inductor varies directly with the frequency of voltage impressed thereon, while the reactance presented by a capacitor varies inversely with the frequency. Consequently, as the frequency of the voltage supplied through transformer 48 changes in either direction, the reactance presented by inductor 53 changes in a direction opposite from that presented by the capacitor elements 52 and 54. This, as will be seen, is the principle upon which the frequency-responsive bridge 26 operates.

As the frequency is increased above the resonance value, the reactance of inductor 53 is raised and that of capacitors 52 and 54 lowered, thereby increasing the voltage drop $E_2$ and lowering voltage drops $E_1$ and $E_3$. In consequence, the displacement angle between grid voltage $E_g$ and energizing voltage $E_p$ is shifted to a higher value than for the resonance condition described. This new set of conditions is shown in Fig. 3 which depicts the voltage relations in the bridge circuit when the regulated frequency is above normal.

Similarly, as the frequency is decreased below the resonance value, the reactance of inductor 53 is lowered and that of capacitors 52 and 54 raised, thereby decreasing the voltage drop $E_2$ and raising voltage drops $E_1$ and $E_3$. In consequence, as is shown in Fig. 4 which depicts the voltage relations when the regulated frequency is below normal, the displacement angle between grid voltage $E_g$ and energizing voltage $E_p$ is shifted to a lower value than for the resonance condition.

Figure 3:
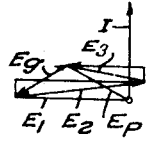
Figure 4:
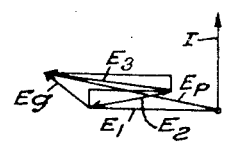

In the vector diagrams of Figs. 2, 3, and 4 the resistance components of the impedance drop in the reactor and capacitor elements 53 and 54 have been exaggerated to permit of a clearer showing of the voltage relations involved. Because of this exaggeration, the change from 90° in the displacement of voltage $E_2$ with respect to current I, which actually is limited to an exceedingly small angle, appears in the vector diagrams much larger than it really is.

It will be noted that whereas the phase position of the current I with respect to the energizing voltage $E_p$ remains substantially constant with variations in frequency, that of grid voltage $E_g$ may be shifted through a range of nearly 180° with respect to $E_p$.

Interposed between the common connection point 55 of the frequency-responsive bridge 26 and the primary winding of grid coupling transformer 57 is an additional capacitor 62 which, as will be more completely pointed out later, imparts to the regulator an anti-hunting characteristic.

Assuming that $E_g$ is displaced from $E_p$ by the value given by Fig. 2, the phase position of voltage $E_{g'}$ impressed upon transformer 57 may have the value given by the angle theta in Fig. 5, the presence in series with the primary winding of transformer 57 of the capacitor 62 accounting for the increase in magnitude of the leading angle of $E_{g'}$ (Fig. 5) over that of $E_g$ (Fig. 2) with respect to voltage $E_p$. For this value, which is assumed to correspond to the desired frequency of regulated generator 10, current conduction through tubes 20 and 22 starts at an intermediate point in the positive half cycles of anode voltage. The effective conduction of the tubes is under such condition sufficient to maintain the excitation of the driving motor 14 at the value required to maintain the desired-frequency speed.

Thus, in operation of the system of Fig. 1, a change in the frequency of the regulated generator acts through the bridge 26 to so modify the grid voltage impressed upon the tubes 20 and 22 that the current conduction therethrough is changed in a manner appropriate to effect a corrective adjustment in the speed of the generator-driving motor 14. For example, a rise in the frequency of generator voltage $E_p$ serves, as indicated in Fig. 4, to increase the phase displacement between waves $E_g$ and $E_p$ and hence between $E_{g'}$ and $E_p$ (Fig. 5), thereby causing current conduction of tubes 20 and 22 to start later in the positive half cycles of their anode voltages. This decrease in the current supplied to motor field winding 18, which is differentially related to main field winding 25, allows winding 25 to increase the motor excitation, and to thereby reduce the motor speed, which effects a corresponding reduction in the generator frequency.

Similarly, a decrease below the desired value in the generator frequency will be seen to institute a series of actions which are exactly opposite to those just described. In other words, the amount of displacement between waves $E_g$ and $E_p$ is decreased so that the angle theta becomes less and causes the conduction of tubes 20 and 22 to occur at an earlier point in the positive half cycles of the anode voltages. The resulting increase in energizing current supplied to the motor field winding 18, because of its differential relation to winding 25, causes the motor to increase its speed and to thereby raise the frequency back to the desired value.

As mentioned, series-connected capacitor 62, which in practice is so dimensioned electrically that the circuit in which it is connected is given a predominating value of capacitive reactance, has been found to impart to the regulator very desirable anti-hunting characteristics. Experimental set-ups of the equipment without capacitor 62 show that the equipment has a marked tendency to overshoot in its corrective action, which tendency, however, is completely overcome by the insertion of the capacitor. In addition to capacitor 62, it may be desired to utilize another auxiliary capacitor device for the purpose of by-passing higher harmonics, which may be present in the voltage of the generator to be regulated. Such a device is shown at 64. It is so dimensioned electrically as not to materially change the action of devices 53 and 54 with which it is connected in parallel.

The regulating system of Fig. 1 now having been described, attention may be directed to the second embodiment of my invention which is illustrated in Fig. 6. In this figure, the frequency regulating system is shown as being applied to the same motor driven generator 10, as is shown and described in connection with Fig. 1, utilizing speed-adjusting means comprising electronic tubes 20 and 22. The regulating field winding 18' of driving motor 14 is in the system of Fig. 6 cumulatively related to main winding 25 rather than differentially as in the system of Fig. 1. Winding 18' is energized through the tubes named which are supplied from alternating-current generator conductors 11 through transformer 27', which transformer will be seen to comprise, in addition to secondary windings 38 and 44, which complete transformer 27 of Fig. 1, three additional secondary windings 70, 71 and 72.

Winding 70 energizes a phase-shifting bridge circuit comprising a capacitor 75 connected in series with a full-wave rectifier 76, the direct-current terminals of which are respectively connected with the plate and filament elements 78 and 79 of a vacuum tube 80. This phase-shifting bridge circuit, the output terminals of which are connected with grid coupling transformer 57 associated with electronic tubes 20 and 22, is the same as that shown in Fig. 1 of the drawings and described in the specification of my copending application Serial No. 568,537, filed October 13, 1931. As is there pointed out, the vacuum tube 80 serves to control the effective resistance of rectifier 76 which in turn varies, with respect to voltage $E_p$ which energizes the circuit, the phase displacement of voltage $E_{g'}$ impressed upon the primary winding of grid-coupling transformer 57. That is to say, an increase in negative bias impressed upon grid element 82 of detector tube 80 increases the phase angle displacement of voltage $E_{g'}$ causing, as reference to Fig. 5 has shown, the effective conductivity of electronic tubes 20 and 22 to be lessened. This lowers the current supplied the motor winding 18' causing motor 14 to increase its speed and raise the frequency of generator 10.

In a similar manner, decreasing the negative bias impressed upon the element of tube 80 or making this bias positive with respect to filament 79 of the tube decreases the phase angle lead of $E_{g'}$, and thereby raises the effective conductivity of tubes 20 and 22. By thus increasing the excitation of driving motor 14, the speed and frequency of generator 10 is reduced.

To control the magnitude and polarity of the grid voltage impressed upon detector tube 80, the bridge circuit 85 is utilized. As in the case of circuit 26 of the system of Fig. 1, bridge circuit 85 is energized by the voltage of the regulating generator 10 through transformer 48. As shown, the circuit comprises a capacitor 87, an inductor 88 and a resistor 89, all energized in series by transformer winding 51, which also directly energizes a second resistor 90. Intermediate the elements thus described and detector tube 80 is disposed rectifying means comprising a pair of vacuum tubes 92 and 93. The filament elements of these tubes are supplied with current from winding 72 of transformer 27', while the plate elements 95 and 96 thereof are acted upon by the potential $E_h$ appearing across reactor 88, which potential is transmitted to the tubes through a transformer 98, one end of the secondary winding of which is connected through conductor 100 to the filament elements of the tube, while the other end is joined with an adjustable tap connection 102 of a potentiometer comprising resistor 103, the two ends of which resistor are respectively connected with plate elements 95 and 96.

The grid elements 105 and 106 of tubes 92 and 93 are influenced by the difference of potential $E_m$ between the midpoints of bridge circuit resistors 89 and 90, which potential is impressed across a resistor 108, the two ends of which are respectively joined with the two grid elements, while the midpoint of the resistor is joined with conductor 100 to connect with the filament elements of the two tubes.

Intermediate the plate elements 95 and 96 of the two rectifier tubes is connected a resistor 112 and in association with the two halves thereof are capacitors 113. Across resistor 112 a direct-current potential $E_d$ appears, which potential is directly impressed between the filament and grid element of detector tube 80 to effect the desired control thereof. As will be seen, the magnitude and polarity of voltage $E_d$ is caused to vary in accordance with changes in the frequency of voltage $E_p$ applied to bridge circuit 85, which variations are such as to maintain constant the frequency of regulated generator 10.

The manner of operation of bridge circuit 85 may best be explained by reference to the vector diagram of Fig. 7. Normal frequency of the regulated generator 10 corresponds to a condition of resonance between the reactances presented by series connected capacitor 87 and inductor 88. For such a resonance condition, the reactances of these two elements neutralize each other, thereby causing the current flowing therethrough to be in phase with the voltage $E_p$, since the effective impedance contains only a resistance component, chiefly supplied by resistor 89. This condition is represented in Fig. 7 by the coincidence of vectors $E_p$ and I, for which condition of the potential $E_m$ between the midpoints 89 and 90 will be of zero magnitude.

The voltage $E_h$ appearing across inductor 88, and which is impressed upon the plate elements 95 and 96 will at all times lead the current flowing through the inductor by an angle of substantially 90°, as indicated in Fig. 7. In this figure the combined voltage drop across inductor 88 and capacitor 87 is designated by $E_k$. The grid potential $E_m$ impressed upon both tubes 92 and 93 being of a balanced or zero value, the conductivity of these tubes is matched, so that the magnitude of detector grid voltage $E_d$ will be zero. For purposes of explanation it will be assumed that such grid bias on detector tube 80 results in the proper excitation adjustment of driving motor 14 to maintain regulated generator 10 at the desired frequency speed.

In the event that the frequency of generator 10 rises above the desired value, the reactance of inductor 88 correspondingly increases and that of capacitor 87 correspondingly decreases. This causes the inductive reactance, by overbalancing the capacitive reactance in the series connected circuit supplied by transformer winding 51, to predominate, with the result that the current flowing in this circuit lags the voltage $E_p$ impressed thereon, as is indicated by the right-hand portion of the diagram of Fig. 7. In other words, the voltage $E_r$ across resistor 89 no longer coincides with the voltage $E_p$ directly impressed upon resistor 90, and as a result, there appears between the midpoints of these two resistors a potential difference $E_m$, as indicated by the vector of that designation at the right of Fig. 7. It will be noted that $E_m$ is in phase with voltage $E_h$ impressed upon the plate elements 92 and 93.

By virtue of the connection of the left end of the secondary winding of transformer 98 with the midpoint of resistor 108, the wave of grid voltage $E_m$ impressed upon the grid element of tube 93 is in phase, under the conditions just described, with the wave of plate voltage $E_h$ impressed upon the plate element of tube 93, whereas in the case of tube 92 the wave of grid voltage is 180° out of phase with the plate voltage. Tube 92 consequently has a lower effective conductivity than does tube 93. Such being the case, the left end of resistor 112, which is connected with the plate element of tube 92, will be maintained at a higher positive potential than is the right-hand end of the resistor to which the filament element 79 of detector tube 80 is directly connected. The grid element 82 of tube 80 being joined with the left-hand end of the resistor 112 will, therefore, be made more positive with respect to the filament element of the tube. Such a change in bias acts, as has been seen, to effect a decrease in the speed of driving motor 14 and a consequent reduction back to the desired frequency of the regulated generator 10.

In a similar manner, a decrease below the desired value in the regulated frequency lowers the reactance presented by inductor 88 and raises that presented by capacitor 87 of bridge circuit 85. This causes the current I flowing through these two series connected elements to lead the voltage $E_p$ impressed thereon, as is indicated by the left-hand portion of Fig. 7. The voltage $E_m$ influenced by the grid elements of tubes 92 and 93 accordingly takes on a value which has an opposite phase position to that of voltage $E_h$ appearing across inductor 88, as is indicated by vector $E_m$ at the left of Fig. 7. For this condition, the wave of grid voltage impressed upon tube 92 is in phase with the plate voltage acting thereon, while the grid voltage impressed upon tube 93 is out of phase with the plate voltage.

Tube 92 consequently is given a higher conductivity than is tube 93, so that the right-hand end of resistor 112 is of a higher positive potential than the left-hand end. The magnitude of the negative grid bias of detector tube 80 thus being increased, the speed of the motor 14 is raised and the frequency of regulating generator 10 is accordingly corrected back to the desired value.

If desired, a voltmeter may be connected to the filament and grid elements of detector tube 80 for the purpose of providing frequency indications. Such a voltmeter is shown at 120. By calibrating the instrument in terms of frequency, a relatively accurate indicating system is obtainable, it having been seen that the magnitude and polarity of voltage $E_d$ is a direct function of the frequency of the regulating generator 10.

The bridge circuit 85, which has just been described is found in practice to be exceedingly sensitive and capable of very close adjustment. As a means of adjusting or calibrating the circuit to change the frequency at which the regulating system will maintain generator 10, contact member 102 may be moved along the length of resistor 103 to change the point of balance of the circuit. In other words, a movement in one direction will make necessary a higher frequency to maintain both ends of resistor 112 at the same potential, while a movement in the other direction will lower the frequency required to maintain the balanced condition.

In Fig. 8 is shown a partial view of the complete regulating system of Fig. 6, in which certain modifications in the frequency-responsive bridge combination 85 have been made. Instead of utilizing intermediate the tuned series circuit, comprising capacitor and inductor elements 87 and 88, and the grid circuit of detector tube 80, electronic tube rectifiers, the bridge circuit 85' of Fig. 7 utilizes a pair of constant-characteristic rectifiers 125 and 126, interconnected in well known manner, which rectifiers may, for example, be of the well known Rectox type. These rectifiers are respectively connected between the grid and filament elements of detector tube 80 and the two ends of the secondary winding of a transformer 98', the primary winding of which is influenced by the voltage $E_h$ appearing across inductor 88.

The frequency responsive voltage $E_m$ derived from the midpoints of resistors 89 and 90, as in bridge circuit 85 of Fig. 6, is impressed between the midpoint 127 of the secondary winding of transformer 98' and an intermediate point 129 of a resistor 131 connected on the other side of the rectifier units. To effect a smoothing out of the ripples in the rectified voltage, capacitors 133 and 134 may be utilized in a well known manner.

Assuming that the bridge circuit is balanced, in which case voltage $E_m$ is of zero magnitude, the effect of the alternating voltage $E_h$ impressed upon transformer 98' is to cause voltage $E_d$ impressed upon the grid element of detector tube 80 to be of zero magnitude. Applying voltage $E_m$ between points 127 and 129 unbalances that portion of the bridge comprising rectifiers 125 and 126, causing voltage $E_d$ to have a tangible value which is of one polarity or the other depending upon the phase relation of $E_m$ to $E_h$.

Such being the case, it will be apparent that the regulating results described in connection with the system shown in Fig. 6 may be duplicated by the utilization of the modified form of bridge circuit shown at 85' in Fig. 8. In this circuit, the desired frequency of the regulated generator may be changed by appropriately shifting the position of connection 129 along the length of resistor 131, which, as an analysis of the circuit will indicate, changes the value of the frequency at which balanced conditions are obtained.

It will be noted that in all three of the bridge circuits respectively shown at 26, 85 and 85' in Figs. 1, 6 and 8, utilization is made of a series connected inductor and capacitor, the reactance values of which change in opposite directions with changes in frequency, and that advantage of this characteristic is taken in all three instances to produce the necessary changes in a control voltage applied to the grid circuit of an electronic tube which forms a part of the frequency adjusting means associated with the generator or circuit to be regulated.

Although I have shown and described certain specific embodiments of my invention, I am fully aware that many further modifications thereof are possible. My invention, therefore, is not to be restricted except insofar as is necessitated by the prior art and by the scope of the appended claims.

I claim as my invention:

1. A regulating system comprising in combination with a circuit and means, utilizing an electronic tube, for adjusting the frequency of the voltage acting in said circuit, two capacitor elements and an inductor element connected in series for energization by said circuit voltage, and means energized by the voltage appearing across the inductor element and one of said capacitor elements for impressing a wave of control potential upon said electronic tube.

2. A regulating system comprising in combination with a circuit and means, utilizing an electronic tube, for adjusting the frequency of the voltage acting in said circuit, two capacitor elements and an inductor element connected in series for energization by said circuit voltage, and means energized by the voltage appearing across the inductor element and one of said capacitor elements for impressing a wave of control potential upon said electronic tube, said inductor element and the capacitor element last named being so dimensioned electrically that at the desired frequency of the regulated circuit the reactances of these two elements are substantially equal.

3. A regulating system comprising in combination with a circuit and means, utilizing an electronic tube, for adjusting the frequency of the voltage acting in said circuit, two capacitor elements and an inductor element connected in series for energization by said circuit voltage, means energized by the voltage appearing across the inductor element and one of said capacitor elements for impressing a wave of control potential upon said electronic tube, and a capacitor connected in series with said means and the said source of its energizing voltage.

4. A regulating system comprising, in combination with a circuit and means, utilizing an electronic tube, for adjusting the frequency of the voltage acting in said circuit, two capacitors and an inductor connected in series for energization by said circuit voltage, means energized by the voltage appearing across the inductor and one of the capacitors for impressing a wave of control potential upon said electronic tube, and a capacitor connected in parallel with the inductor and the capacitor last referred to.

5. Means for generating a control potential which varies in accordance with the frequency of the voltage acting in an alternating-current circuit, said means comprising two capacitors and an inductor connected in series, means for energizing said connection by a measure of the voltage of said circuit, and means for deriving the desired control potential from the voltage which appears across the inductor and one of the capacitors.

6. Means for generating a control potential which varies in accordance with the frequency of the voltage acting in an alternating-current circuit, said means comprising two capacitors and an inductor connected in series, and means for energizing said connection in accordance with the voltage of said circuit, the voltage appearing across the inductor and one of the capacitors constituting the desired control potential the character of which is responsive to changes in frequency, said inductor and the capacitor last named being so dimensioned electrically that at a given frequency of the alternating-current circuit voltage the reactances of these two devices are substantially equal.

FINN H. GULLIKSEN.